United States Patent [19]
Schad

[11] Patent Number: 4,821,663
[45] Date of Patent: Apr. 18, 1989

[54] BOAT HULL

[76] Inventor: Robert D. Schad, 110 Bloor St. West, Suite 2104, Toronto, Ontario, Canada

[21] Appl. No.: 51,763

[22] Filed: May 20, 1987

Related U.S. Application Data

[63] Continuation-in-part of Ser. No. 759,764, Jul. 29, 1985, Pat. No. 4,669,408.

[51] Int. Cl.⁴ ............................................. B62B 15/00
[52] U.S. Cl. ........................................ 114/43; 114/61; 114/283; 114/284
[58] Field of Search ............... 114/283, 284, 285, 286, 114/287, 61, 43, 40, 123; 440/37

[56] References Cited

U.S. PATENT DOCUMENTS

| | | | |
|---|---|---|---|
| 978,311 | 12/1910 | Lake | 114/285 |
| 1,923,958 | 8/1933 | Wesnigk | 114/284 |
| 2,165,633 | 7/1939 | Hunt | 114/43 |
| 2,272,661 | 2/1942 | Finley | 440/37 |
| 3,139,058 | 6/1964 | Robinson | 114/61 |
| 3,998,176 | 12/1976 | Stout et al. | 114/283 |

FOREIGN PATENT DOCUMENTS

| | | | |
|---|---|---|---|
| 176458 | 4/1986 | European Pat. Off. | 114/61 |
| 702733 | 1/1931 | France | 440/37 |
| 167389 | 9/1984 | Japan | 114/61 |

*Primary Examiner*—Sherman D. Basinger
*Assistant Examiner*—Thomas J. Brahan
*Attorney, Agent, or Firm*—Bachman & LaPointe

[57] ABSTRACT

An amphibious boat hull is disclosed having at least three co-extensive, longitudinally disposed hull sections in which at least two sections, in a projected condition, have sufficient buoyancy to support the overall boat independently of the third hull section when the boat is moored or underway.

5 Claims, 2 Drawing Sheets

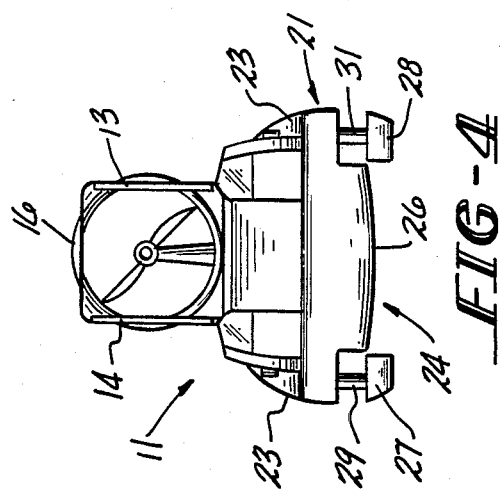
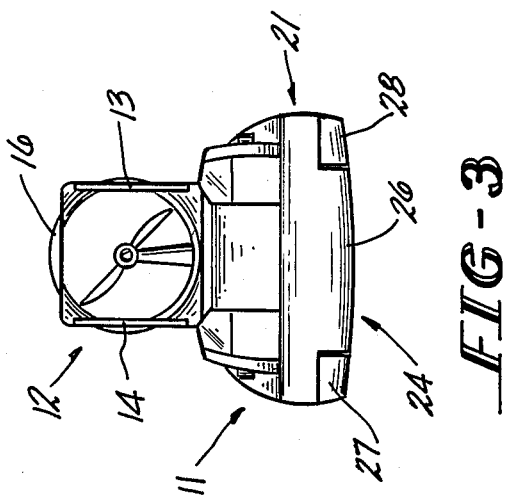
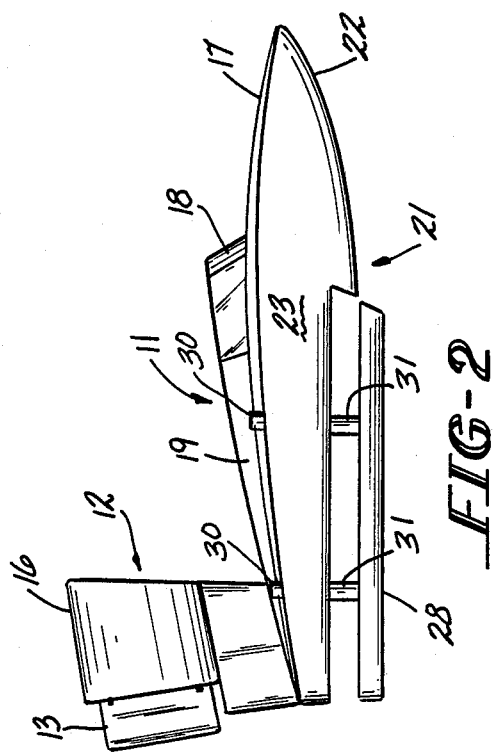
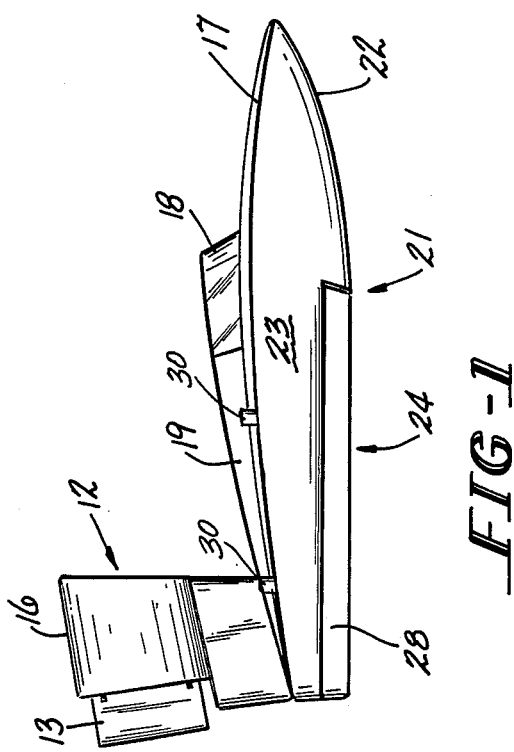

BOAT HULL

RELATED APPLICATION

This application is a continuation-in-part of a prior application Ser. No. 759,764 filed July 29, 1985 by Robert D. Schad entitled AMPHIBIOUS JET POWERED CRAFT, now U.S. Pat. No. 4,669,408

BACKGROUND OF THE INVENTION

The present invention relates to the hull structure of an amphibious craft and relates in particular to a method for providing a divided hull structure.

The prior art is replete with hull structures having movable pontoons, skis or other appendages for reducing the wetted area or frictional drag on the overall boat hull when underway at high speeds.

Typical of the prior art are the disclosures of U.S. Pats. Nos. 4,574,724 and 4,067,286.

U.S. Pat. No. 4,574,724 patent discloses a tunnel 18 for scooping air at high boat speeds; the air is directed to the under side of hull portions 42 and 44 to provide a "skin" or sheet of air to reduce friction between the hull and the water.

U.S. Pat. No. 4,067,286 discloses hydro-skis such as skis 42—42 (FIGS. 6, 7, and 8) which operate when moving at high speeds to reduce the area of the hull planning surface.

SUMMARY OF THE INVENTION

In contrast, the present invention is directed to a method of reducing the wetted area of a boat hull by dividing the hull into at least three sections where at least two movable sections have sufficient buoyancy to support the boat independently of the third section when the boat is moored or underway.

That is, the method of dividing the hull structure is such that the boat does not depend upon speed through the water to sustain lift.

A further feature of the invention is the provision of means for projecting side or lateral sections of the hull beyond the plane of a central hull section.

A further feature of the invention is the division of the hull longitudinally into at least three sections defining a central section straddled by or sandwiched between two lateral hull sections.

A still further feature is the provision of hull sections which are substantially coextensive longitudinally and which define a substantially flat bottomed hull in the unprojected condition.

A still further feature is the provision of a boat having lateral hull sections so constructed and arranged that, in the projected condition and fully submerged, provide sufficient buoyancy of lift to support the entire boat independently of any other instrumentality or flotation structure.

A still further feature of the invention is the provision of a boat hull having at least three separate hull sections where two of the hull sections include bottom and side portions of the hull.

A still further feature of the invention is the provision of a substantially flat bottomed boat hull defining a central section straddled by two movable lateral hull sections including the provision of means for moving the lateral hull sections in unison or independently of one another.

A further feature of the invention is the provision of lateral hull sections which are movable from a nested position to an extended position by spring means and said sections are supported in the extended position by said spring means.

A further feature of the invention is the provision of piston means for collapsing said spring means whereby said lateral hull sections are moved from the extended position to the nested position.

A still further feature of the invention is the provision of sockets in said lateral hull sections or in said central hull section providing a housing for extensible and retractable transport wheels.

A method of creating a boat hull embracing certain principles of the present invention may comprise the steps of dividing the hull into at least three sections defining a central hull section and two lateral hull sections, providing means for projecting said lateral hull sections relative to said central hull section; and, providing sufficient buoyancy in said lateral hull sections whereby said sections, in the projected condition, are operable to support the overall boat independently of said central hull section when the boat is moored or underway.

Other features and advantages of the present invention will become more apparent from an examination of the succeeding specification when read in conjunction with the appended drawings; in which,

BRIEF DESCRIPTION OF DRAWINGS

FIG. 1 is a side view of a boat hull illustrating principles of the present invention with the lateral hull sections in the retracted or nested position;

FIG. 2 is a view similar to the illustration of FIG. 1 with the lateral hull sections projected beyond the central hull section;

FIG. 3 is a view of the left end of FIG. 1 showing the lateral hull sections in the retracted, nested or flat bottomed mode;

FIG. 4 is a view of the left end of FIG. 2 showing the lateral hull sections projected beyond the central hull section;

DETAILED DESCRIPTION OF THE PREFERRED EMBODIMENT

Figure 6:
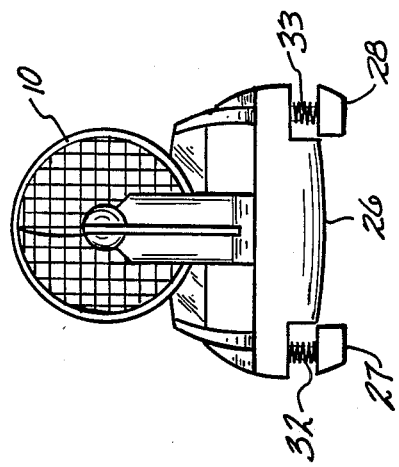
FIG. 6 is a view of the left end of FIG. 5.

Referring in detail to the drawings, in particular FIGS. 1, 2, 3 and 4, the reference numeral 11 designates an amphibious craft or boat powered by a fan type air screw 12 driven by a suitable internal combustion engine (not shown) in well known fashion.

The power system includes dual rudders 13-14 and circular cowling 16 and a deck 17 is fitted with a wind screen 18 terminating in a coaming 19.

As shown in FIGS. 5 through 8, the cowling 16 may be replaced by a cage 10 with a single central rudder 15.

A hull, indicated generally by the reference numeral 21 includes a bow portion 22, side portion 23 and bottom portion 24.

The portion of the hull that is normally in contact with a support surface is divided longitudinally into three sections namely a central hull section 26 and two side or lateral hull sections 27 and 28.

The lateral sections 27 and 28 supported by shafts or pins 29—29 and 31—31, are movable in unison or individually from the retracted or nested position of FIGS. 1 and 3 to the extended or projected position of FIGS. 2 and 4 by any suitable double acting mechanical or hydraulic means operated manually or automatically, driving shafts 29 and 31 in reciprocatory fashion, as engineering and design considerations dictate.

For example, a hydraulic piston and cylinder arrangement as indicated by the reference numeral 30 in FIGS. 1 and 2 or a rack and pinion with a hand crank represent suitable means for moving the lateral sections 27 and 28.

It is well within the inventive concept to move the lateral sections in step by step fashion so that they may be projected and retained releasably in various positions relative to the central section 26.

The inventive concept also includes projecting the lateral sections horizontally as well as vertically or at any included angle depending upon the amphibious use for which craft is intended.

In the retracted or nested mode the lateral sections in combination with the central section define substantially a flat bottomed or generally planar wetting surface.

Design and engineering considerations as well as optimum performance may necessitate small offsets or small steps extending along the length of the lateral hull sections between the flat surfaces of the central section 26 and the lateral sections 27 and 28 without departing from the basic flat bottomed configuration.

Correspondingly there may be similar small steps or small offsets in the side wall of the hull at the junction of the retracted lateral sections and the main body of the hull.

The lateral sections 26 and 27 are so constructed and arranged to include a hull bottom portion and a hull side portion.

It has been found that lateral hull sections in the projected position displacing collectively approximately 20 cubic feet of water create lift of the order of 1200 pounds sufficient to support an entire boat independent of the central section 26 while the boat is moored or underway.

Figure 5:
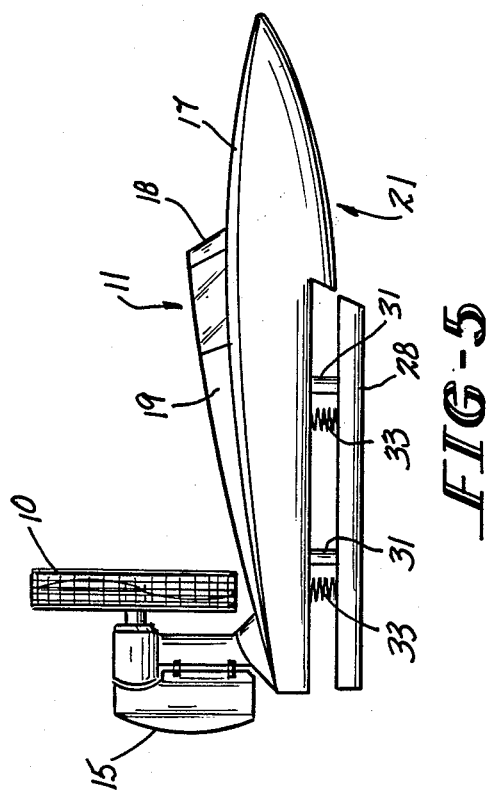
FIG. 5 is a view similar to FIG. 2 showing the lateral hull sections extended and supported by spring means with an alternative air screw structure.

Referring to FIGS. 5 and 6, spring means defining coil springs 3213 32 and 3313 33 are secured to the boat hull as at 34 and to the lateral hull sections 27 and 28 at 36.

The springs shown in extension are of sufficient strength to support the main body of the boat hull and in this condition the pins 2913 29 and 3113 31 serve merely as guides.

That is, in the extended mode of FIGS. 5 and 6, all the vertical load on the lateral hull sections 27 and 28 is borne by the springs and the shafts 29 and 31 serve as stabilizing guides.

When it is desired to retracy the hull sections, the springs 32 and 33 are compressed by applying power to shafts 29 and 31 by suitable known means as discussed previously.

If desired, the springs may be compressed partially to change the fore and aft trim of the boat or to change the lateral cant or list.

Figure 8:
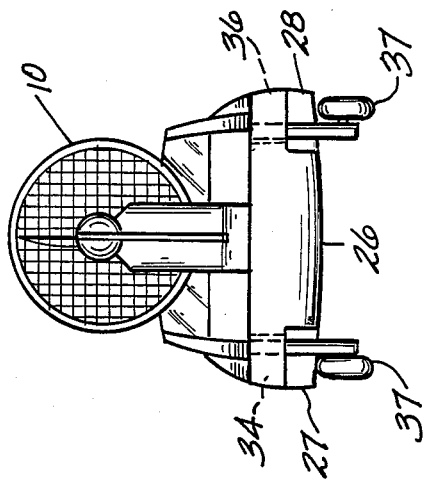
FIG. 8 is a view of the left end of the illustration of FIG. 7.
Figure 7:
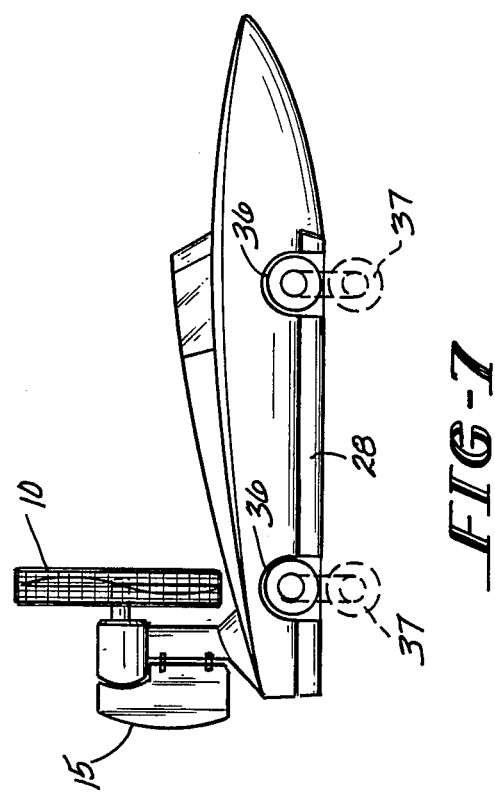
FIG. 7 is a side view of the boat hull showing sockets for housing extensible transport wheels.

In an alternative embodiment shown in FIGS. 7 and 8, the lateral hull sections 27 and 28 (or the central hull section 26) are formed with sockets or recesses 34 and 36 forming a housing for retractable and extensible transport wheels 37.

Here again, a suitable known automatic mechanical pneumatic or hand operated units (not shown) are incorporated in the lateral hull sections or in the central hull section, as the case may be, to raise and lower the wheels to facilitate land transport thereby avoiding, on many occasions, the need for a boat trailer.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hull structure for a highly maneuverable amphibious craft useful for transportation over hull support surfaces such as rotten ice, slush, snow, swamps, short spans of lowland, rough seas, ships wakes, ocean growlers and the like comprising:
a hull body having an exterior working surface, said working surface having bilges defining a junction between a hull bottom portion and a hull side portion, each said bilge further defining a movable hull section normally disposed substantially flush with said exterior working surface and recessed therein, said movable hull section being co-extensive with that portion of the hull body which normally contacts said hull support surfaces and spring means for projecting said bilges beyond the hull body to reduce the effective area of said working surface, said spring means being of sufficient size and area so as to be operable in the projected condition to support the craft when stationary or at rest, as well as when the craft is underway.

2. The hull structure of calim 1 including shaft means for guiding and stabilizing said bilges when in said projected position.

3. The hull structure of claim 1 including power means for overcoming the compressive strength of said spring means whereby said bilges are returned to said recessed position.

4. The hull structure of claim 3 in which said power means is operable to compress said spring means incrementally and individually whereby the trim and the list of the hull body can be adjusted.

5. The hull structure of claim 1 in which the working surface is formed with sockets providing a housing for retractile transport wheel connected to said hull body.

* * * * *